(12) United States Patent
Tully et al.

(10) Patent No.: US 10,947,418 B2
(45) Date of Patent: Mar. 16, 2021

(54) CYANOACRYLATE COMPOSITIONS

(71) Applicant: Henkel IP & Holding GmbH, Duesseldorf (DE)

(72) Inventors: Raymond Tully, Slane Meath (IE); Rory Barnes, Dublin (IE); Mark Loane, Dublin (IE); Robert Lambert, Dublin (IE); Cecile Ollagnier, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 280 days.

(21) Appl. No.: 15/972,944

(22) Filed: May 7, 2018

(65) Prior Publication Data

US 2018/0362808 A1  Dec. 20, 2018

Related U.S. Application Data

(63) Continuation of application No. PCT/EP2016/076751, filed on Nov. 4, 2016.

(30) Foreign Application Priority Data

Nov. 6, 2015 (GB) .................................... 1519647

(51) Int. Cl.
*C09J 4/06* (2006.01)
*C08F 222/32* (2006.01)

(52) U.S. Cl.
CPC ............... *C09J 4/06* (2013.01); *C08F 222/32* (2013.01); *C08F 222/322* (2020.02)

(58) Field of Classification Search
CPC ........ C09J 4/06; C08F 222/32; C08F 222/322
USPC ...................................................... 524/321
See application file for complete search history.

(56) References Cited

U.S. PATENT DOCUMENTS

| | | | |
|---|---|---|---|
| 3,832,334 A | 8/1974 | O'Sullivan | |
| 4,196,271 A | 4/1980 | Kimura et al. | |
| 4,440,910 A | 4/1984 | O'Connor | |
| 4,450,265 A | 5/1984 | Harris | |
| 4,490,515 A * | 12/1984 | Mariotti | C09J 4/00 526/204 |
| 4,532,293 A | 7/1985 | Ideka et al. | |
| 4,556,700 A | 12/1985 | Harris et al. | |
| 4,622,414 A | 11/1986 | Mckervey | |
| 4,636,539 A | 1/1987 | Harris et al. | |
| 4,695,615 A | 9/1987 | Leonard et al. | |
| 4,718,966 A | 1/1988 | Harris et al. | |
| 4,837,260 A | 6/1989 | Sato et al. | |
| 4,855,461 A | 8/1989 | Harris et al. | |
| 4,906,317 A | 3/1990 | Liu | |
| 5,288,794 A | 2/1994 | Attarwala | |
| 5,312,864 A | 5/1994 | Wenz et al. | |
| 5,328,944 A * | 7/1994 | Attarwala | C09J 4/00 524/83 |
| 5,424,343 A | 6/1995 | Attarwala | |
| 5,530,037 A | 6/1996 | Mcdonnell et al. | |
| 5,536,799 A | 7/1996 | Takahashi et al. | |
| 6,294,629 B1 | 9/2001 | O'Dwyer et al. | |
| 6,607,632 B1 | 8/2003 | Mcdonnell | |
| 9,249,237 B2 * | 2/2016 | Perichaud | C08F 265/04 |
| 2008/0314519 A1 * | 12/2008 | Attarwala | C08L 2666/02 156/331.8 |
| 2014/0124137 A1 * | 5/2014 | Hedderman | C09J 133/18 156/331.8 |

FOREIGN PATENT DOCUMENTS

| | | |
|---|---|---|
| CN | 101258211 | 9/2008 |
| JP | H06-145606 | 5/1994 |
| WO | 2007008971 | 1/2007 |

OTHER PUBLICATIONS

Kotzev et al. "Assessment of the Adhesive Bond Properties of Allyl-2-cyanoacrylate", Journal of Applied Polymer Science, vol. 26, 1981, pp. 1941-1949. (Year: 1981).*
International Search Report issued in connection with International Patent Application No. PCT/EP2016/076751 dated Jan. 12, 2017.
H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).
G.H. Millet, "Cyanoacrylate Adhesives" in Structural Adhesives: Chemistry and Technology, S.R. Hartshorn, ed., Plenum Press, New York, p. 249-307 (1986).
Nie Cong et al., "Study on humidity-heat aging resistance of a-cyanoacrylate adhesives", vol. 1, pp. 9-11 (2013).
Li Hongqiang edited, "Principle Technology and Application of Adhesion", South China University of Technology Press, pp. 130.
Huang Farong et al., "Plastic Industry Handbook—Unsaturated Polyester Resin", Chemical Industry Press, pp, 50, 1st edition, Mar. 2001.

* cited by examiner

*Primary Examiner* — Michael Bernshteyn
(74) *Attorney, Agent, or Firm* — Steven C. Bauman

(57) ABSTRACT

Cyanoacrylate compositions that include, in addition to an allyl-2-cyanoacrylate, a rubber toughening component and a component functionalized with at least two blocked hydroxyl groups are provided.

22 Claims, 13 Drawing Sheets

CYANOACRYLATE COMPOSITIONS

BACKGROUND

Field

Cyanoacrylate compositions that include an allyl-2-cyanoacrylate, a rubber toughening component and a component functionalized with at least two blocked hydroxyl groups are provided.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

Henkel Corporation (as the successor to Loctite Corporation) has sold for a number of years since the filing of the '910 patent rubber toughened cyanoacrylate adhesive products under the tradename BLACK MAX, which employ as the rubber toughening component the DuPont materials called VAMAC B-124 and N123. In addition, Henkel has sold in the past clear and substantially colorless rubber toughened cyanoacrylate adhesive products, namely, LOCTITE 4203, 4204 and 4205, which employ as the rubber toughening component the DuPont material, VAMAC G. While VAMAC G contains no fillers to provide color or stabilizers, it does contain processing aids.

And in an effort to improve moisture and thermal resistance of cyanoacrylates applied to substrates constructed with nitrogen- or sulfur-containing compounds, such as synthetic rubbers like chloroprene rubber and EPDM, and Bakelite, U.S. Pat. No. 5,536,799 discloses a cyanoacrylate adhesive composition which comprises (a) a cyanoacrylate and (b) at least one di- or higher functional ester, such as tri- or higher acrylates or methacrylates, having an alcohol residue and having an acid residue, where the alcohol residue is a residue of dipentaerythritol and the acid residue is a residue of an acrylic or methacrylic acid. More specifically, the di- or higher functional ester is reported as (i) an ester of a dipentaerythritol with an acrylic acid or a methacrylic acid, (ii) an ester of a modified alcohol with an acrylic acid or a methacrylic acid, where the modified alcohol is a dipentaerythritol modified by addition of a lactone, and (iii) a combination of an ester of a dipentaerythritol with an acrylic acid or a methacrylic acid and an ester of the modified alcohol with an acrylic acid or a methacrylic acid.

Notwithstanding the state-of-the-technology, it would be desirable to provide a cyanoacrylate composition, reaction products of which demonstrate improved thermal degradation resistance compared to known cyanoacrylate compositions.

SUMMARY

Provided herein are cyanoacrylate compositions that include an allyl-2-cyanoacrylate, a rubber toughening component and a component functionalized with at least two blocked hydroxyl groups. These cyanoacrylate compositions demonstrate improved thermal degradation resistance compared to known cyanoacrylate compositions.

The rubber toughening component has (a) reaction products of the combination of ethylene, methyl acrylate and monomers having carboxylic acid cure sites, (b) dipolymers of ethylene and methyl acrylate, and combinations of (a) and (b).

The component functionalized with at least two (meth) acrylate groups may be selected from a wide range of materials, provided that at least two (meth)acrylate groups are available for reaction in the cyanoacrylate composition. A more thorough discussion of this component is provided below.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description", which follows.

DETAILED DESCRIPTION

Figure 1:
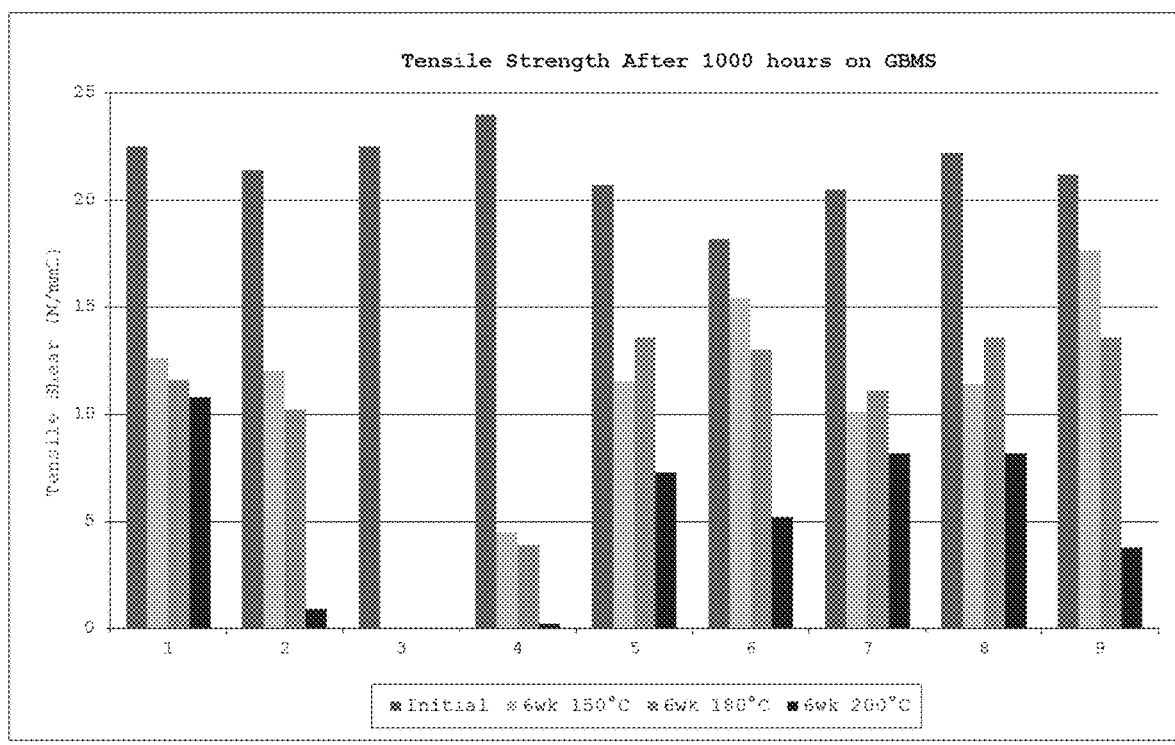
FIG. 1 shows the tensile strength performance of formulations of Table 1 on GBMS after heat ageing at the provided temperatures for 1000 hours.
Figure 2:
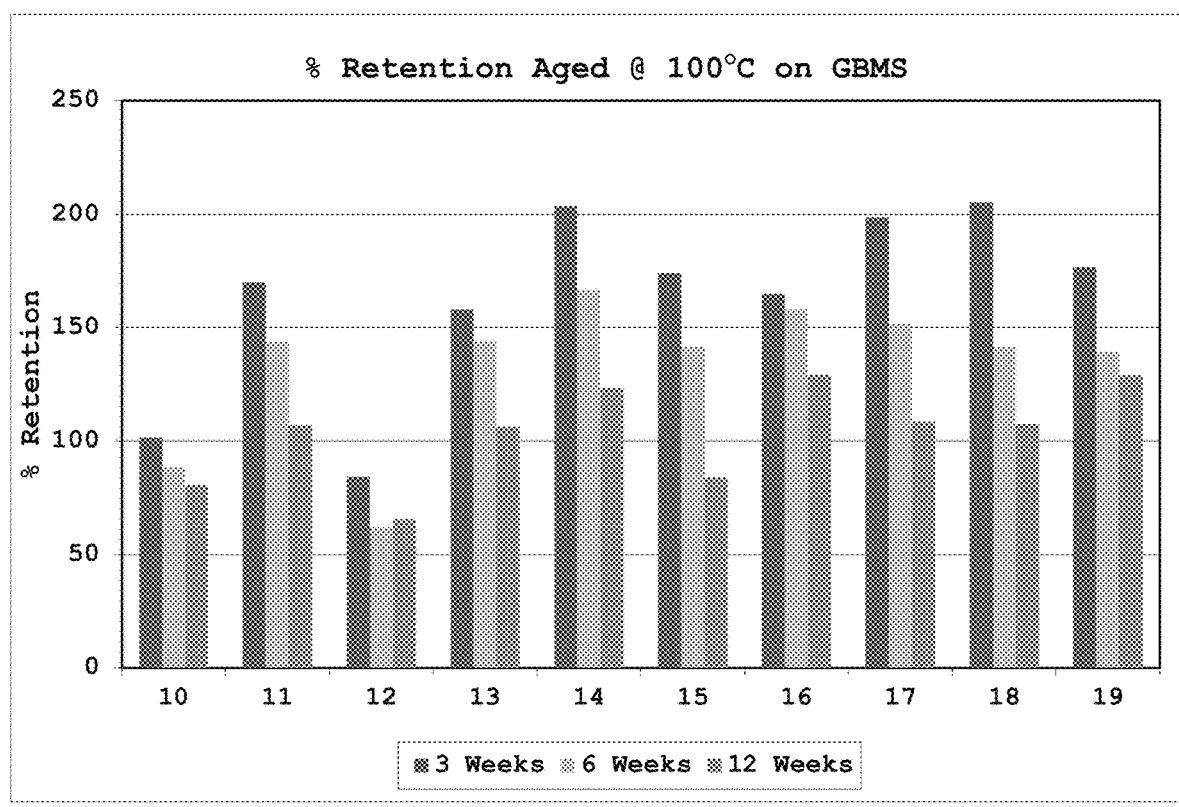
FIG. 2 shows the percentage of initial tensile strength retention for the formulations of Table 2 on GBMS after heat ageing at 100° C. for 3, 6 and 12 weeks.
Figure 3:
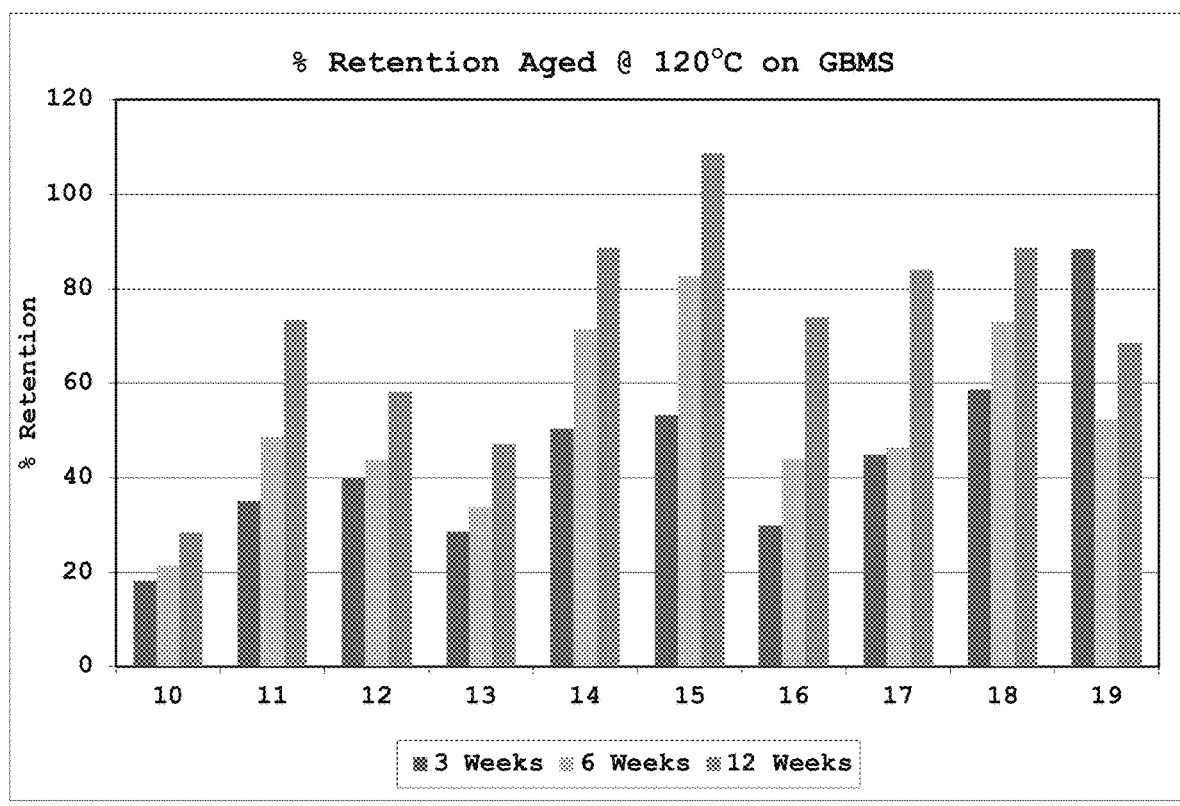
FIG. 3 shows the percentage of initial tensile strength retention for the formulations of Table 2 on GBMS after heat ageing at 120° C. for 3, 6 and 12 weeks.
Figure 4:
FIG. 4 shows the percentage of initial tensile strength retention for the formulations of Table 2 on GBMS after heat ageing at 150° C. for 3, 6 and 12 weeks.
Figure 5:
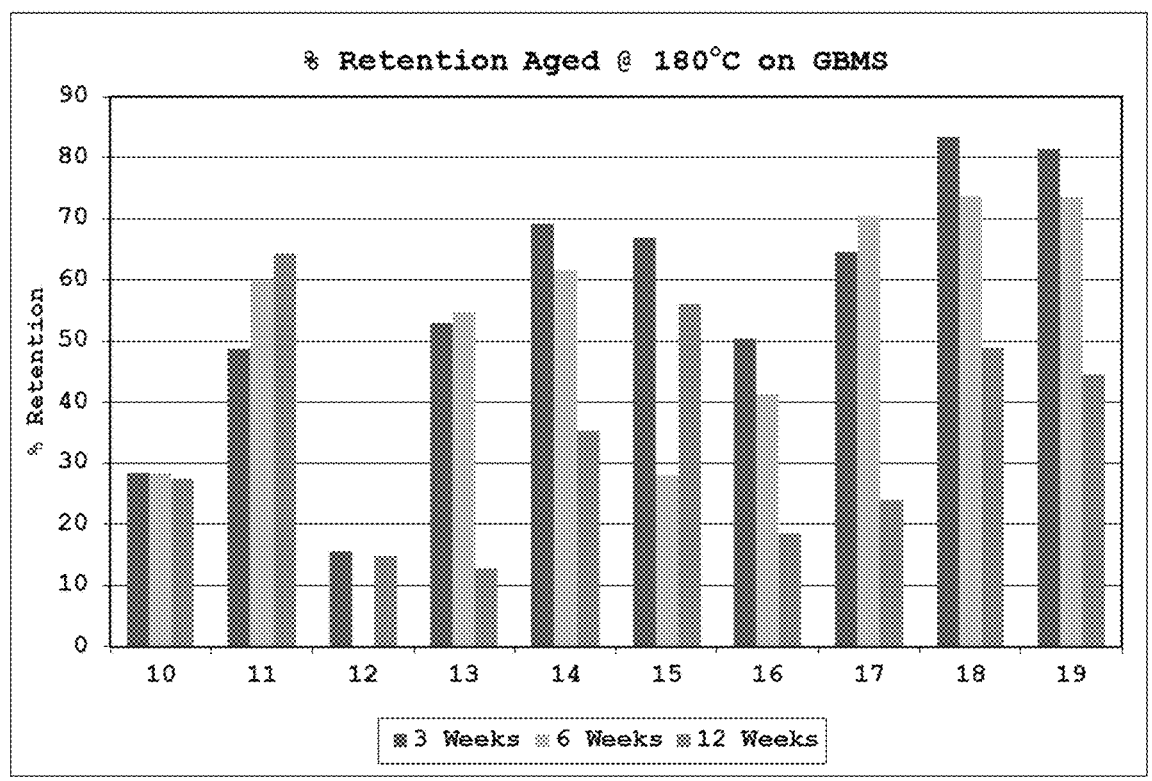
FIG. 5 shows the percentage of initial tensile strength retention for the formulations of Table 2 on GBMS after heat ageing at 180° C. for 3, 6 and 12 weeks.
Figure 6:
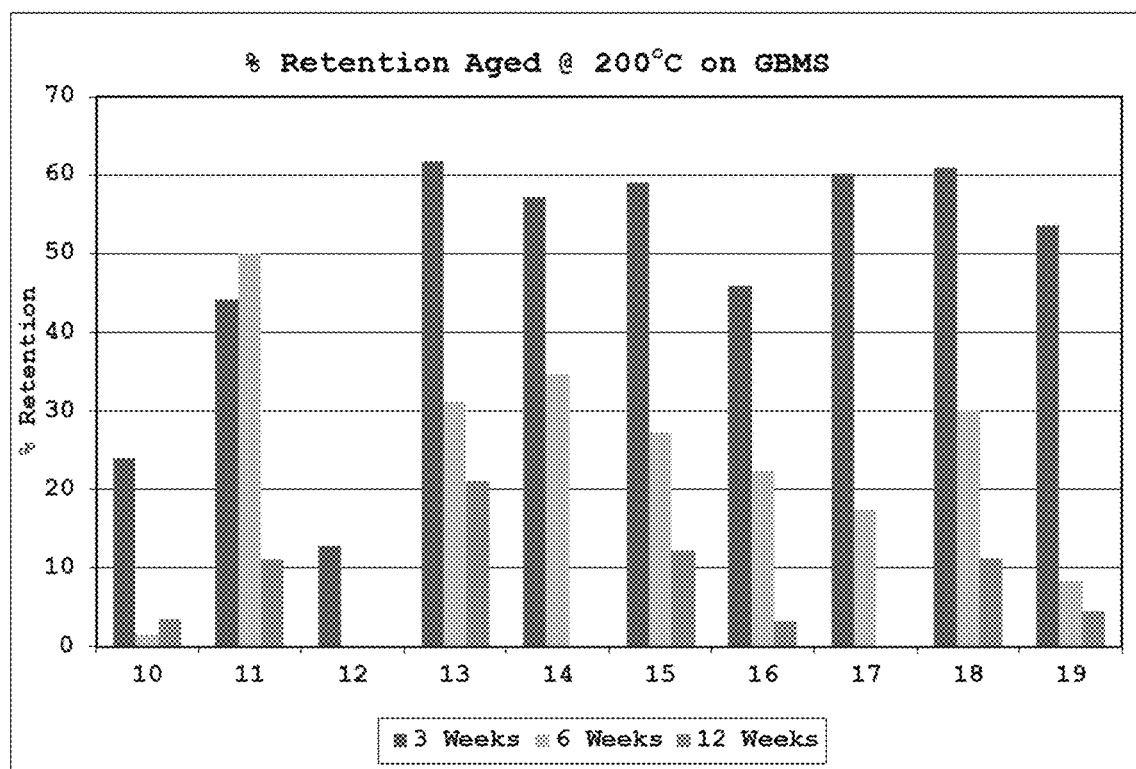
FIG. 6 shows the percentage of initial tensile strength retention for the formulations of Table 2 on GBMS after heat ageing at 200° C. for 3, 6 and 12 weeks.

As noted above, provided herein are cyanoacrylate compositions that include an allyl-2-cyanoacrylate, a rubber toughening component and a component functionalized with at least two blocked hydroxyl groups.

The rubber toughening component comprises (a) reaction products of the combination of ethylene, methyl acrylate and monomers having carboxylic acid cure sites, (b) dipolymers of ethylene and methyl acrylate, and combinations of (a) and (b).

Examples of the rubber toughening component include those materials sold under the VAMAC trade name, including G, B-124, VMX (such as VMX 1012), VCS (such as VCS 5500 or 5520), and N123, all of which being available from DuPont, Wilmington, Del.

VAMAC N123 and VAMAC B-124 are reported by DuPont to be a master batch of ethylene/acrylic elastomer. The DuPont material VAMAC G is a similar copolymer, but contains no fillers to provide colour or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

The rubber toughening component should be present in a concentration of about 1.5% to about 20% by weight, such as about 5% to about 15% by weight, with about 8% to about 10% being particularly desirable.

The component functionalized with at least two blocked hydroxyl groups may be selected from a variety of materials.

For instance, since the "blocked hydroxyl" group is intended to liberate a hydroxyl group under conditions of exposure (i.e., elevated temperature conditions), a variety of linkages may be formed that are susceptible to cleavage under such conditions. Esters are chief among the linkages formed. Reaction with an appropriate carboxylic acid under appropriate conditions will generate the ester linkage. Anhydrides are another example of linkages that may be formed to block the hydroxyl group. Carbonates are still another example of a linkage to block the hydroxyl functional group.

Desirably, the component functionalized with at least two blocked hydroxyl groups should have (meth)acrylate groups at the portions of the compound where the hydroxyl groups will be liberated. For example, the component functionalized with at least two blocked hydroxyl groups may be a diol or polyol wherein at least two alcohol functional groups are blocked (or protected) by (meth)acrylate groups.

It has been found that the presence of many of the underlying components having at least two hydroxyl functional groups show an adverse impact on the shelf life stability of the cyanoacrylate composition to which they have been added. Blocking the hydroxyl groups has alleviated the observed shelf life stability issues.

The component functionalized with at least two blocked hydroxyl groups may be a component with at least two (meth)acrylate functional groups. The component with at least two (meth)acrylate functional groups should be an aliphatic compound having at least two (meth)acrylate functional groups, preferably at the terminal ends of an aliphatic chain, though pendant (meth)acrylate functional groups along the aliphatic chain is appropriate as well, particularly where more than two (meth)acrylate functional groups are present in the molecule. Alkane di- and tri-ol di- and tri-(meth)acrylates, respectively, are a few examples of such compounds. More specifically, hexanediol dimethacrylate and hexanediol diacrylate are desirable. In addition, di-trimethylolpropane tetraacrylate and trimethylolpropane trimethacrylate are also desirable.

For example the component containing at least two (meth)acrylate functional groups may have the following formula:

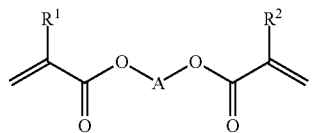

wherein A is a $C_4$ to $C_{30}$ aliphatic chain which can optionally comprise heteroatoms selected from the group consisting of O, N and S, and wherein said chain is optionally substituted with one or more acrylate and/or methacrylate functional groups, and/or one or more $C_1$-$C_{10}$ alkyl groups; and wherein $R^1$ and $R^2$ may be the same or different and are each optionally selected from the group consisting of H and $C_1$ to $C_6$ alkyl.

Suitably the component having at least two (meth)acrylate functional groups has the formula:

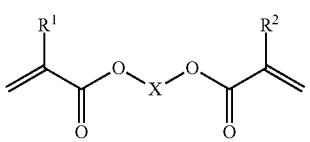

wherein $R^1$ and $R^2$ are the same or different and are selected from the group consisting of H or Me; and wherein X is a C4 to C30 alkyl chain which can optionally comprise heteroatoms selected from the group consisting of O, N and S and wherein said chain is optionally substituted with one or more acrylate and/or methacrylate functional groups, and/or one or more $C_1$-$C_{10}$ alkyl groups.

X may be a $C_4$ to $C_3$ alkyl chain, for example X may be a $C_4$ alkyl chain, or a $C_5$ alkyl chain, or a $C_6$ alkyl chain, or a $C_7$ alkyl chain, or a $C_8$ alkyl chain, or a $C_9$ alkyl chain, or a $C_{10}$ alkyl chain, or a $C_{11}$ alkyl chain, or a $C_{12}$ alkyl chain.

Examples of compounds functionalized with at least two blocked hydroxyl groups are provided below:

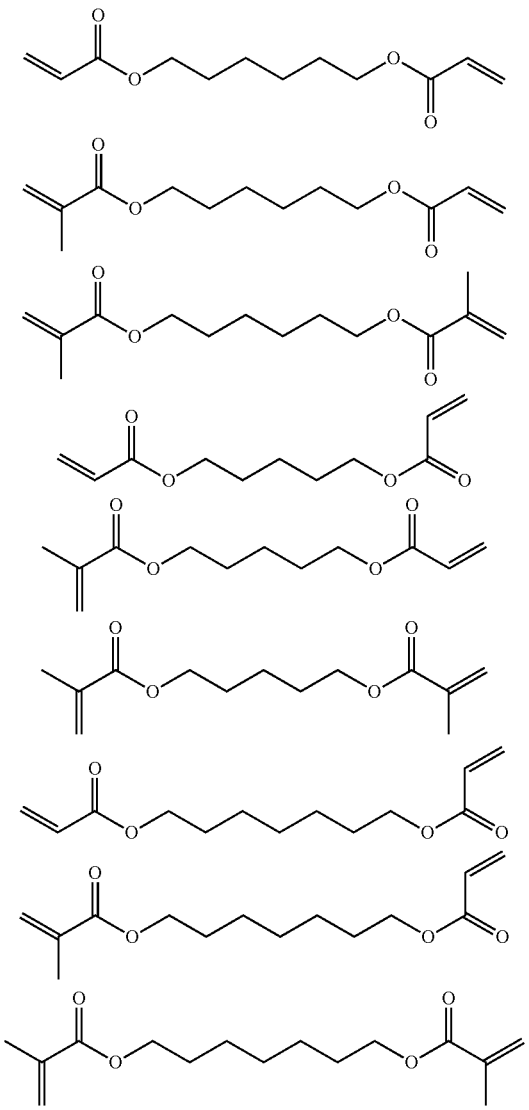

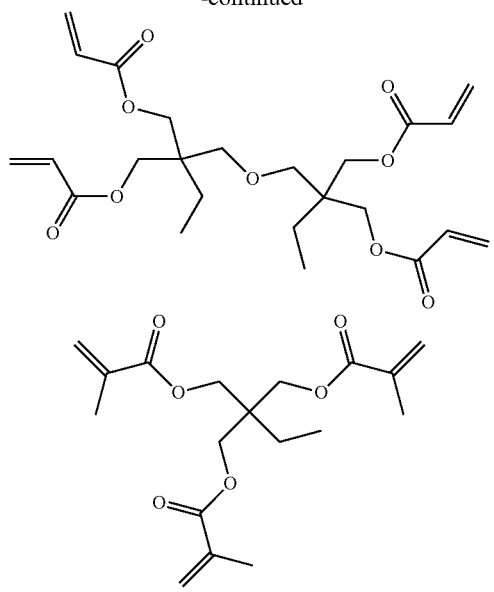

The component should be present in a concentration of about 1.5% to about 20% by weight, such as about 5% to about 15% by weight, with about 8% to about 10% by weight being particularly desirable.

In addition to the allyl-2-cyanoacrylate may be included a cyanoacrylate component selected from cyanoacrylate monomers having a raft of substituents, such as those represented by $H_2C=C(CN)$—COOR, where R is selected from $C_{1-15}$ alkyl, alkoxyalkyl, cycloalkyl, alkenyl, aralkyl, aryl, and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, β-methoxyethyl cyanoacrylate and combinations thereof. A particularly desirable one is ethyl-2-cyanoacrylate.

The additional cyanoacrylate component should be included in the compositions in an amount within the range of from about 50% to about 98% by weight, with the range of about 75% to about 95% by weight being desirable, and about 85 to about 90% by weight of the total composition being particularly desirable.

Thermal resistance conferring agents may also be added. Included among such agents are certain sulfur-containing compounds, such as sulfonates, sulfinates, sulfates and sulfites as set forth in U.S. Pat. No. 5,328,944 (Attarwala), the disclosure of which is hereby expressly incorporated herein by reference.

Maleimide components may also be added, either alone or in combination with other thermal resistance conferring agents.

Suitable maleimides include those having the following structures:

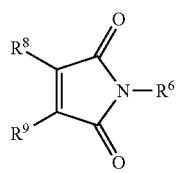

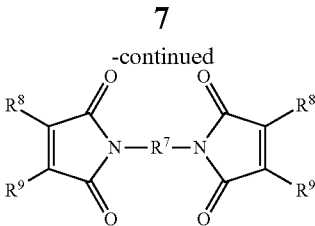

$R^6$ and $R^7$ may be independently selected from $C_1$-$C_{50}$ alkyl, and $C_4$-$C_{20}$ aryl, wherein $R^6$ and $R^7$ may each independently be optionally substituted with one or more of nitro, hydroxyl, halogen, $C_1$-$C_{20}$ alkyl, $C_3$-$C_{20}$ cycloalkyl, $C_7$-$C_{20}$ aralkyl and $C_7$-$C_{20}$ alkaryl; and $R^8$ and $R^9$ may independently be selected from H, $C_1$-$C_{50}$ alkyl, and $C_1$-$C_{50}$ aryl, or together R8 and R9 may form a ring comprising from 5 to 20 carbon atoms.

For example, $R^7$ may be represented by the following structure:

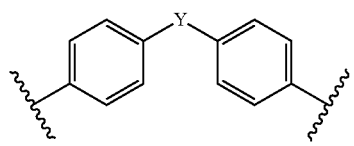

where the phenyl groups are optionally substituted at one or more positions with linear, branched or cyclic alkyl, alkenyl, alkynyl, alkoxy or aryl groups having from 1 to about 20 carbon atoms, with or without substitution by halogen, hydroxyl, nitrile, ester, amide or sulfate and Y may represent O, S, carbonyl, sulfone or primary or secondary methylene groups optionally substituted with linear, branched or cyclic alkyl, alkenyl, alkynyl, alkoxy or aryl groups having from about 1 to about 20 carbon atoms, with or without substitution by halogen, hydroxyl, nitrile, ester, amide or sulfate.

Desirable maleimides include the following:

X
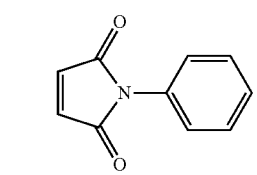

XI
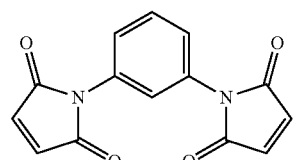

XII
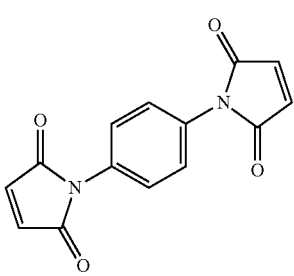

XIII
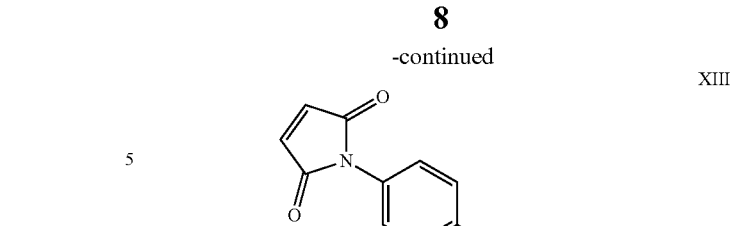

XIV
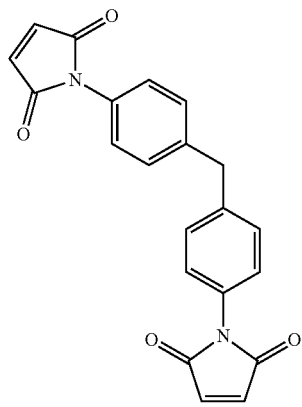

XV
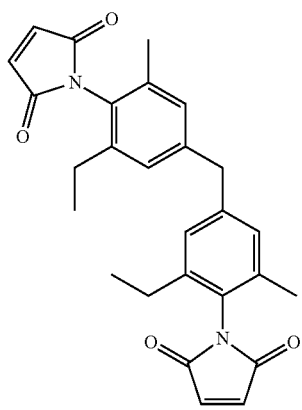

Suitably the maleimide component comprises one or more of N-phenyl maleimide, N,N'-m-phenylene bismaleimide, N,N'-(4,4'-methylene diphenylene)bismaleimide, bis-(3-ethyl-5-methyl-4-maleimidephenyl)methane, or [2,2'-bis[4-(4'maleimidediphenoxy)phenyl]propane.

Compositions of the invention may optionally comprise additives which confer thermal resistance properties such as 2-sulfobenzoic acid anhydride, triethylene glycol di(p-toluene sulfonate), trifluoroethyl p-toluene sulfonate, dimethyl dioxolen-4-ylmethyl p-toluene sulfonate, p-toluene sulfonic anhydride, methanesulfonic anhydride, 1,3 propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride, tetrafluoroisophthalonitrile and combinations thereof.

When used, the thermal resistance conferring additives may be included in the compositions in an amount within the range of from about 0.01% to about 10% by weight, with the range of about 0.1 to about 5.0% by weight being desirable, and about 1.0% by weight of the total composition being particularly desirable.

Suitably, the thermal resistance conferring additives may include a maleimide component and tetrafluoroisophthalonitrile.

Accelerators may also be included in the inventive rubber toughened cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

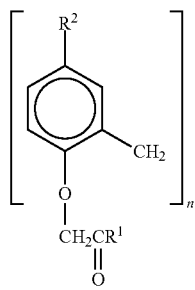

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerator

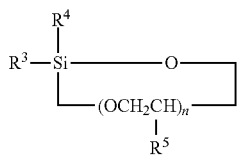

include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:
where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

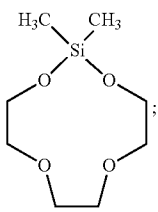

dimethylsila-11-crown-4

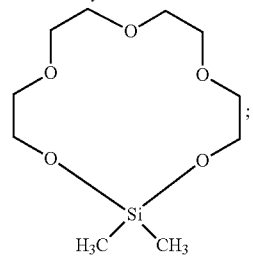

dimethylsila-14-crown-5

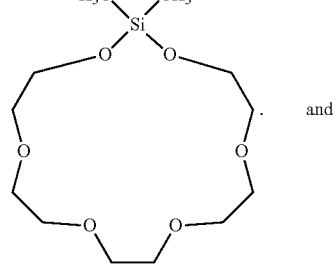

dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

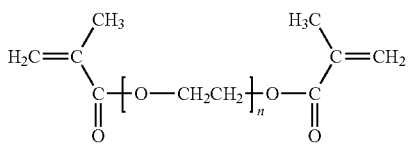

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

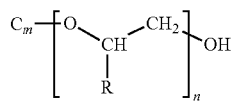

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within the above structure include those offered under the DEHYDOL tradename from Henkel KGaA, Dusseldorf, Germany, such as DEHYDOL 100.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included to confer additional physical properties, such as improved shock resistance, thickness (for instance, polymethyl methacrylate), thixotropy (for instance fumed silica), and color. Such additives therefore may be selected from certain acidic materials (like citric acid), thixotropy or gelling agents, thickeners, dyes, and combinations thereof.

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

In another aspect, there is provided a method of bonding together two substrates, which method includes applying to at least one of the substrates a composition as described above, and thereafter mating together the substrates for a time sufficient to permit the adhesive to fixture. For many applications, the substrate should become fixed by the compositions in less than about 150 seconds, and depending on the substrate as little as about 30 seconds. In addition, the composition should develop shear strength on the substrates between which they have been applied, as well as side impact strength and fracture toughness.

In yet another aspect, there is provided reaction products of the so-described compositions.

In still another aspect, there is provided a method of preparing the so-described compositions. The method includes providing an allyl-2-cyanoacrylate component, a rubber toughening agent, and a component containing at least two (meth)acrylate functional groups, and mixing to form the cyanoacrylate composition.

These aspects of the invention will be further illustrated by the examples which follow.

EXAMPLES

Example 1

A number of samples comprising an allyl-2-cyanoacrylate component, a rubber toughening agent and a component functionalized with at least two blocked hydroxyl groups were prepared as provided in Table 1.

The rubber toughening agent is comprised of:
(a) reaction products of the combination of ethylene, methyl acrylate and monomers having carboxylic acid cure sites, (b) dipolymers of ethylene and methyl acrylate, and combinations of (a) and (b).

The control sample does not comprise a component functionalized with at least two blocked hydroxyl groups.

The initial tensile strengths of control and test compositions were evaluated on grit blasted mild steel (GBMS). The results are provided in Table 1.

Tensile strengths were determined according to Henkel STM 700 for the determination of shear strength of adhesives using lap shear specimens.

TABLE 1

|  | 1 | 2 | 3 | 4 | 5 | 6 | 7 | 8 | 9 |
|---|---|---|---|---|---|---|---|---|---|
| Allyl CA | 86.0 | 43.0 | — | 45.5 | 38.0 | 38.0 | 38.0 | 38.0 | 38.0 |
| Ethyl CA | — | 43.0 | 86.0 | 45.5 | 38.0 | 38.0 | 38.0 | 38.0 | 38.0 |
| Acid | 4.0 | 4.0 | 4.0 | 4.0 | 4.0 | 4.0 | 4.0 | 4.0 | 4.0 |
| Stabiliser |  |  |  |  |  |  |  |  |  |
| Vamac | 10.0 | 10.0 | 10.0 | 5.0 | 10.0 | 10.0 | 10.0 | 10.0 | 10.0 |
| Sr355 | — | — | — | — | 10.0 | — | — | — | — |
| HDDA | — | — | — | — | — | 10.0 | — | — | — |
| PETriA | — | — | — | — | — | — | 10.0 | — | — |
| PETetraA | — | — | — | — | — | — | — | 10.0 | — |
| BisCA | — | — | — | — | — | — | — | — | 10.0 |
| Initials (GBMS) | | | | | | | | | |
| 7 d RT | 22.5 | 21.4 | 22.5 | 24.0 | 20.7 | 18.2 | 20.5 | 22.2 | 21.2 |
| 150° C. | | | | | | | | | |
| 3 Weeks | 11.4 | 9.3 | 0.6 | 4.7 | 11.5 | 12.1 | 10.4 | 12.3 | 17.7 |
| 6 Weeks | 12.6 | 12.0 | 0.0 | 4.5 | 11.5 | 15.4 | 10.1 | 11.4 | 17.7 |
| 3 Weeks | 10.0 | 8.7 | 0.0 | 3.8 | 12.5 | 13.6 | 11.9 | 13.8 | 13.6 |
| 6 Weeks | 11.6 | 10.2 | 0.0 | 3.9 | 13.6 | 13.0 | 11.1 | 13.6 | 13.6 |

TABLE 1-continued

|  | 1 | 2 | 3 | 4 | 5 | 6 | 7 | 8 | 9 |
|---|---|---|---|---|---|---|---|---|---|
| 200° C. | | | | | | | | | |
| 3 Weeks | 10.5 | 6.0 | 0.0 | 1.5 | 10.3 | 10.5 | 10.8 | 10.2 | 1.8 |
| 6 Weeks | 10.8 | 0.9 | 0.0 | 0.2 | 7.3 | 5.2 | 8.2 | 8.2 | 3.8 |

Hexanediol dimethacrylate, di-trimethylolpropane tetracrylate (SR355), hexane diol bis cyanoacrylate (Bis CA), pentaerythritol triaacrylate (PETriA) and pentaerythritol tetracrylate (PETetraA) were also screened in this study. The effect of allyl and ethyl CA as well as the level of the rubber toughening agent (Vamac) were also looked at.

Formulations 1 to 3 have varying concentrations of cyanoacrylate monomers. The 100% allyl-2-cyanoacrylate formulation (No. 1) gives good results overall even without an additive, particularly after heat ageing on GBMS at 200° C.

A 50/50 mix (No. 2) of the allyl cyanoacrylate/ethyl cyanoacrylate gives good results after heat ageing on GBMS at 150 and 180° C., but when heat aged at 200° C. the tensile strengths obtained were significantly lower.

The formulation comprising ethyl cyanoacrylate as the sole cyanoacrylte component (No. 3), as expected demonstrated poor tensile strengths after heat ageing at all temperatures tested.

The level of rubber toughening agent (Vamac) in the formulation also proved important. Comparing formulations 2 and 4 the results are much lower for the formulation with the lower level of rubber toughening agent (Vamac), typically half the performance with half the rubber toughening agent.

Overall the formulation comprising hexanediol dimethacrylate (formulation 6) gives the best performance of the various additives investigated, a slight drop off after 6 weeks at 200° C. being the only slight negative.

The formulation comprising hexanediol bis cyanoacrylate (BisCA) (formulation 9) again showed excellent tensile strength results after heat ageing at 150° C. Comparable results were obtained when tensile strengths were measured after heat ageing at 180° C.; however, when assessed after heat aging at 200° C. the tensile strengths for formulation 9 on GBMS were considerably lower.

The tensile strength determined for formulation 5 which comprises di-trimethylolpropane tetracrylate (SR355) after heat ageing at 200° C. for 3 weeks on GMBS was approximately 10 MPa. This dropped slightly to approximately 7 MPa after heat ageing at 200° C. for 6 weeks.

Similarly, the tensile strength determined for formulations 6, 7 and 8 was over 10 MPa after heat ageing at 200° C. for 3 weeks, but the tensile strength for each formulation dropped off after heat ageing for a further 3 weeks (to a total of 6 weeks). The formulation comprising hexanediol diacrylate (formulation 6) delivered a tensile strength after heat ageing for 6 weeks at 200° C. of approximately 5 MPa, whereas the tensile strength determined for formulations 7 and 8 after the same ageing conditions was approximately 8 MPa for each formulation.

The effect of varying levels of hexanediol and the rubber toughening agent on tensile strengths was subsequently assessed.

Formulations 10 to 19 were prepared as provided in Table 2.

Each of formulations 10 to 19 were evaluated for thermal performance by determining the tensile strength for each formulation on mild steel (MS) substrate, after heat ageing for 3, 6 or 12 weeks.

The performance of formulations 10 to 19 under humid conditions was also evaluated.

Formulation 10 is the control formulation which comprises 42 wt % ethyl cyanoacrylate, 45 wt % allyl cyanoacrylate, 3 wt % stabilizer and 10 wt % rubber toughening agent.

The level of hexane diol diacrylate, and the effect of including additives on tensile strength performance is assessed in the formulations of Table 2.

Initial tensile strengths were assessed after curing for 24 hours on mild steel (MS), aluminium (Al), polycarbonate (PC) and polyvinylchloride (PVC) substrates.

In addition, tensile strength was assessed for each formulation on GBMS substrate, after ageing for 3, 6 or 12 weeks at room temperature, 100° C., 120° C., 150° C., 180° C. and 200° C.

TABLE 2

|  | 10 | 11 | 12 | 13 | 14 | 15 | 16 | 17 | 18 | 19 |
|---|---|---|---|---|---|---|---|---|---|---|
| Ethyl CA | 42.00 | 37.00 | 37.00 | 37.00 | 35.75 | 34.50 | 38.25 | 35.75 | 34.50 | 36.00 |
| Allyl CA | 45.00 | 40.00 | 40.00 | 40.00 | 38.75 | 37.50 | 41.25 | 38.75 | 37.50 | 39.00 |
| Stabilisier | 3.0 | 3.0 | 3.0 | 3.0 | 3.0 | 3.0 | 3.0 | 3.0 | 3.0 | 3.0 |
| Vamac VSC5500 | 10.0 | 10.0 | 10.0 | 10.0 | 12.5 | 15.0 | 10.0 | 10.0 | 12.5 | 10.0 |
| HDDA | — | 10.0 | 10.0 | — | 10.0 | 10.0 | 7.5 | 12.5 | 12.5 | 10.0 |
| SR355 | — | — | — | 10.0 | — | — | — | — | — | — |
| Naphthosultone | — | — | — | — | — | — | — | — | — | 1.0 |
| Ethylene Sulfite | — | — | — | — | — | — | — | — | — | 1.0 |
| t-Butyl PeroxyBenzoate | — | — | 0.25 | — | — | — | — | — | — | — |
| Initials (RT Cure) | | | | | | | | | | |
| MS | 19.7 | 15.4 | 14.8 | 15.7 | 13.3 | 13.9 | 15.7 | 13.8 | 13.3 | 15.5 |
| Al | 14.1 | 12.2 | 12.6 | 12.5 | 12.2 | 11.3 | 12.6 | 11.5 | 11.2 | 12.0 |
| PC | 4.4 | 3.4 | 3.0 | 3.7 | 2.4 | 1.1 | 1.8 | 1.8 | 2.5 | 3.3 |
| PVC | 5.9 | 3.8 | 4.0 | 4.6 | 4.4 | 3.1 | 4.8 | 3.5 | 3.7 | 4.1 |

TABLE 2-continued

|  | 10 | 11 | 12 | 13 | 14 | 15 | 16 | 17 | 18 | 19 |
|---|---|---|---|---|---|---|---|---|---|---|
| *RT Aged* | | | | | | | | | | |
| MS 3 Weeks | 19.9 | 17.1 | 17.9 | 20.2 | 17.0 | 16.6 | 20.8 | 17.3 | 17.0 | 19.0 |
| MS 6 Weeks | 23.2 | 18.1 | 14.4 | 19.7 | 17.8 | 17.4 | 19.6 | 16.1 | 16.0 | 17.4 |
| MS 12 Weeks | 20.1 | 17.5 | 14.8 | 19.5 | 18.6 | 16.6 | 23.4 | 16.0 | 15.8 | 17.4 |
| *100° C.* | | | | | | | | | | |
| MS 3 Weeks | 20.0 | 26.2 | 12.5 | 24.8 | 27.1 | 24.2 | 25.9 | 27.4 | 27.3 | 27.4 |
| MS 6 Weeks | 17.4 | 22.1 | 9.2 | 22.6 | 22.2 | 19.7 | 24.8 | 20.9 | 18.8 | 21.6 |
| MS 12 Weeks | 15.9 | 16.5 | 9.7 | 16.7 | 16.4 | 11.7 | 20.3 | 15.0 | 14.3 | 20.0 |
| *120° C.* | | | | | | | | | | |
| MS 3 Weeks | 3.6 | 5.4 | 5.9 | 4.5 | 6.7 | 7.4 | 4.7 | 6.2 | 7.8 | 13.7 |
| MS 6 Weeks | 4.2 | 7.5 | 6.5 | 5.3 | 9.5 | 11.5 | 6.9 | 6.4 | 9.7 | 8.1 |
| MS 12 Weeks | 5.6 | 11.3 | 8.6 | 7.4 | 11.8 | 15.1 | 11.6 | 11.6 | 11.8 | 10.6 |
| *150° C.* | | | | | | | | | | |
| MS 3 Weeks | 6.8 | 9.4 | 6.6 | 8.4 | 11.0 | 11.4 | 10.7 | 10.3 | 10.8 | 14.2 |
| MS 6 Weeks | 7.4 | 9.6 | 5.8 | 6.8 | 10.2 | 9.3 | 9.7 | 8.6 | 11.5 | 6.8 |
| MS 12 Weeks | 6.0 | 7.7 | 3.3 | 7.1 | 10.7 | 9.9 | 8.3 | 9.9 | 11.4 | 10.7 |
| *180° C.* | | | | | | | | | | |
| MS 3 Weeks | 5.6 | 7.5 | 2.3 | 8.3 | 9.2 | 9.3 | 7.9 | 8.9 | 11.1 | 12.6 |
| MS 6 Weeks | 5.6 | 9.2 | 0.0 | 8.6 | 8.2 | 3.9 | 6.5 | 9.7 | 9.8 | 11.4 |
| MS 12 Weeks | 5.4 | 9.9 | 2.2 | 2.0 | 4.7 | 7.8 | 2.9 | 3.3 | 6.5 | 6.9 |
| *200° C.* | | | | | | | | | | |
| MS 3 Weeks | 4.7 | 6.8 | 1.9 | 9.7 | 7.6 | 8.2 | 7.2 | 8.3 | 8.1 | 8.3 |
| MS 6 Weeks | 0.3 | 7.7 | 0.0 | 4.9 | 4.6 | 3.8 | 3.5 | 2.4 | 4.0 | 1.3 |
| MS 12 Weeks | 0.7 | 1.7 | 0.0 | 3.3 | 0.0 | 1.7 | 0.5 | 0.0 | 1.5 | 0.7 |
| *40° C./98% RH* | | | | | | | | | | |
| MS 3 Weeks | 8.5 | 13.1 | 15.3 | 14.1 | 15.1 | 14.4 | 14.9 | 14.2 | 152 | 15.6 |
| MS 6 Weeks | 8.4 | 12.3 | 9.2 | 8.8 | 11.5 | 11.9 | 11.1 | 10.5 | 11.7 | 8.4 |
| MS 12 Weeks | 7.0 | 12.1 | 10.8 | 13.4 | 11.8 | 13.0 | 12.4 | 11.3 | 12.3 | 7.5 |

The tensile strength of formulation 11 on MS substrate after heat ageing for 3, 6 or 12 weeks at each of 100° C., 120° C., 150° C., 180° C. and 200° C. was greater than that of the control formulation.

In addition to comprising 10 wt % hexanediol diacrylate formulation 12 further comprises 0.25 wt % of tert-butyl peroxybenzoate.

The initial tensile strength of formulation 12 was lower than that for control formulation 10 and the tensile strength of formulation 12 after heat ageing also proved inferior to the control at all time points for all temperatures tested. Thus the addition of tert-butyl peroxybenzoate had a negative effect on tensile strength performance.

Formulation 13 which comprises 10 wt % di-trimethylolpropane tetraacrylate (SR355) demonstrated similar properties to control formulation 10: comparable tensile strengths were observed after heat ageing at 100° C., 120° C., 150° C., and 180° C., but superior tensile strength was observed after heat ageing at 200° C. Formulation 13 also outperformed control formulation 10 when aged humidity testing was assessed. Excellent fixture time was also observed for formulation 13. Thus di-trimethylolpropane tetraacrylate (SR355) proved to enhance the thermal performance of cyanoacrylate compositions comprising allyl-2-cyanoacrylate and a rubber toughening agent.

Formulations 14 to 18 look at the effect of different levels of hexanediol diacrylate (HDDA) and rubber toughening agent. Higher levels of rubber toughening agent (for example, Vamac) give improved thermal properties at 120° C.

Lower levels of HDDA (Formulation 16) show excellent thermal properties at 100° C. but with inferior aging at 180° C. and 200° C.

Thus low levels of a component functionalized with at least two blocked hydroxyl groups, such as HDDA, enhanced thermal ageing properties at 100° C. whereas higher levels of said component enhance thermal performance of cyanoacrylate compositions comprising allyl-2-cyanoacrylate and a rubber toughening agent at higher temperatures (i.e. temperatures above 100° C.).

Formulations 17 and 18 which comprise 12.5% HDDA had poor initial tensile strengths. Formulation 18 which comprised 12.5 wt % of rubber toughening agent (Vamac) and 12.5 wt % HDDA exhibits excellent tensile strength after heat ageing at 150° C. but again has poor initial tensile strength.

Formulation 19 looks at the effect of naphthosultone and ethylene sulfite. Thermal properties at 100° C. and initially at 120/150/180° C. are excellent.

FIGS. 12 to 18 show the percentage tensile strength retention after formulations 10 to 19 on mild steel substrate after heat ageing for 3, 6 and 12 weeks.

The effect of both naphthosultone and ethylene sulphite on heat ageing performance of allyl cyanoacrylate formulations was also investigated (see Table 3).

TABLE 3

|  | 20 | 21 | 22 | 23 | 24 | 25 | 26 | 27 | 28 |
|---|---|---|---|---|---|---|---|---|---|
| Ethyl CA | 37.00 | 35.90 | 34.90 | 33.90 | 32.40 | 29.90 | — | 32.40 | 29.90 |
| Allyl CA | 40.00 | 40.00 | 40.00 | 40.00 | 40.00 | 40.00 | 74.90 | 40.00 | 40.00 |
| Acid Stabiliser | 3.0 | 3.0 | 3.0 | 3.0 | 3.0 | 3.0 | 3.0 | 3.0 | 3.0 |

TABLE 3-continued

|  | 20 | 21 | 22 | 23 | 24 | 25 | 26 | 27 | 28 |
|---|---|---|---|---|---|---|---|---|---|
| Vamac VSC5500 | 10.0 | 10.0 | 10.0 | 10.0 | 10.0 | 10.0 | 10.0 | 12.5 | 12.5 |
| HDDA | 10.0 | 10.0 | 10.0 | 10.0 | 12.5 | 15.0 | 10.0 | 10.0 | 12.5 |
| TetrahydroPA | — | 0.1 | 0.1 | 0.1 | 0.1 | 0.1 | 0.1 | 0.1 | 0.1 |
| Naphthosultone | — | 0.5 | 1.0 | 1.5 | 1.0 | 1.0 | 1.0 | 1.0 | 1.0 |
| Ethylene Sulfite | — | 0.5 | 1.0 | 1.5 | 1.0 | 1.0 | 1.0 | 1.0 | 1.0 |
| Initials (72 hr RT) | | | | | | | | | |
| GBMS | 19.0 | 17.2 | 16.5 | 14.7 | 14.4 | 12.1 | 14.0 | 13.4 | 12.8 |
| RT Aged GBMS | | | | | | | | | |
| GBMS 3 Weeks | 20.1 | 18.2 | 16.4 | 16.6 | 15.6 | 13.8 | 14.0 | 16.7 | 14.2 |
| GBMS 6 Weeks | 19.0 | 18.7 | 18.0 | 17.4 | 16.3 | 13.3 | 13.8 | 15.6 | 14.6 |
| GBMS 12 Weeks | 21.5 | 19.9 | 19.9 | 17.5 | 16.2 | 13.2 | 14.5 | 18.3 | 14.8 |
| 100° C. | | | | | | | | | |
| GBMS 3 Weeks | 26.2 | 26.6 | 27.4 | 27.6 | 26.5 | 24.3 | 22.6 | 26.8 | 25.2 |
| GBMS 6 Weeks | 22.0 | 25.3 | 27.9 | 27.1 | 27.3 | 23.6 | 22.6 | 26.2 | 23.4 |
| GBMS 12 Weeks | 7.1 | 19.9 | 23.0 | 23.4 | 22.6 | 16.8 | 16.9 | 21.9 | 19.0 |
| 120° C. | | | | | | | | | |
| GBMS 3 Weeks | 5.9 | 11.2 | 19.1 | 22.0 | 15.3 | 11.7 | 9.0 | 21.1 | 19.0 |
| GBMS 6 Weeks | 7.5 | 7.0 | 7.5 | 7.6 | 7.8 | 7.3 | 8.7 | 8.9 | 8.5 |
| GBMS 12 Weeks | 10.2 | 10.5 | 10.2 | 10.7 | 10.2 | 12.6 | 10.2 | 12.7 | 14.8 |
| 150° C. | | | | | | | | | |
| GBMS 3 Weeks | 14.1 | 13.3 | 13.2 | 12.7 | 13.2 | 13.2 | 12.0 | 16.3 | 15.1 |
| GBMS 6 Weeks | 13.5 | 15.6 | 15.2 | 14.0 | 14.2 | 14.4 | 13.7 | 15.2 | 14.7 |
| GBMS 12 Weeks | 16.4 | 17.2 | 16.4 | 17.1 | 15.8 | 17.2 | 15.5 | 18.6 | 15.6 |
| 180° C. | | | | | | | | | |
| GBMS 3 Weeks | 18.0 | 19.5 | 18.1 | 16.9 | 20.0 | 19.1 | 15.8 | 18.8 | 14.7 |
| GBMS 6 Weeks | 17.3 | 15.5 | 17.1 | 16.9 | 16.6 | 19.0 | 18.7 | 21.0 | 19.2 |
| GBMS 12 Weeks | 13.0 | 13.9 | 14.3 | 14.0 | 14.9 | 16.7 | 22.3 | 16.8 | 14.5 |
| 200° C. | | | | | | | | | |
| GBMS 3 Weeks | 7.0 | 8.0 | 4.3 | 6.4 | 10.2 | 11.3 | 12.4 | 6.3 | 9.7 |
| GBMS 6 Weeks | 0.7 | 6.0 | 3.5 | 6.1 | 6.7 | 7.4 | 11.7 | 4.7 | 4.1 |
| GBMS 12 Weeks | 0.0 | 0.0 | 0.7 | 2.6 | 0.0 | 0.0 | 6.1 | 0.0 | 0.0 |
| 40° C./98% RH | | | | | | | | | |
| GBMS 3 Weeks | 14.1 | 14.8 | 13.5 | 13.5 | 13.0 | 11.7 | 13.1 | 12.1 | 11.7 |
| GBMS 6 Weeks | 13.2 | 13.3 | 13.2 | 11.3 | 12.4 | 11.3 | 12.2 | 11.9 | 11.2 |
| GBMS 12 Weeks | 13.8 | 12.6 | 12.0 | 10.0 | 12.0 | 10.9 | 11.1 | 11.2 | 11.1 |
| 65° C./95% RH | | | | | | | | | |
| GBMS 3 Weeks | 15.7 | 12.1 | 9.0 | 5.9 | 9.2 | 9.4 | 6.2 | 6.8 | 8.6 |
| GBMS 6 Weeks | 15.8 | 7.9 | 3.6 | 2.3 | 4.8 | 7.5 | 2.5 | 3.5 | 5.8 |
| GBMS 12 Weeks | 9.0 | 1.7 | 1.3 | 0.8 | 0.5 | 1.7 | 2.3 | 1.2 | 2.0 |

The control formulation (20) contains 10% by weight of the rubber toughening agent and 10% by weight of hexanediol diacrylate. Formulations 21 to 28 comprise the following additives in varying amounts: tetrahydrophthalic anhydride, ethylene sulphite and naphthosultone. The level of each additive is varied as provided in Table 3. The level of stabilizer present in the formulations of Table 3 is 3% by weight of the total composition.

The initial tensile strength values on mild steel substrate are generally in the range of 15 to 17 MPa with the exception of formulation 26, whose cyanoacrylate component is entirely allyl cyanoacrylate. Formulations 27 and 28 which comprise higher levels of rubber toughening agent and higher levels of hexane diol diacrylate had initial tensile strengths of about 12 to 13 MPa. Encouragingly the tensile strengths generally increase over time over a 12 week period at room temperature.

The results at 100° C. are excellent. All formulations of the invention show exceptional strength retention, with an increase in tensile strength being observed in all cases after up to 6 weeks of heat ageing. At the 12 week mark the control formulation (formulation 20) is the only formulation which shows a significant drop off in tensile strength value. The influence of the additives for long term ageing at 100° C. is clear. Ethylene sulphite and naphthosultone markedly improve the heat ageing performance of cyanoacrylate compositions comprising an allyl cyanoacrylate component.

The strength retention for formulations 22, 23, 27 and 28 are excellent after heat ageing at 120° C. up to about the 3 week mark. Without the additives present at a concentration of 1% by weight of the total composition, or in the case of the composition comprising solely allyl 2-cyanoacrylate as the cyanoacrylate component, the tensile strength performance dropped off after heat ageing at 120° C. Disappointingly, after 6 weeks, the tensile strength observed for each of the formulations tested fell between 7 to 9 MPa, with a recovery to about 10 MPa after 12 weeks. Formulations with higher loadings of rubber toughening agent had tensile strength values of 13 to 15 MPa after 12 weeks.

Previous results for the ageing of allyl cyanoacrylate compositions have shown a dip in tensile strength performance after heat ageing at 120° C. due to the fact that allyl cyanoacrylate is unable to thermally crosslink across the allyl group at this relatively low temperature. However, the addition of naphthosultone and ethylene sulphite have been demonstrated herein to eliminate this phenomenon.

Figure 7:
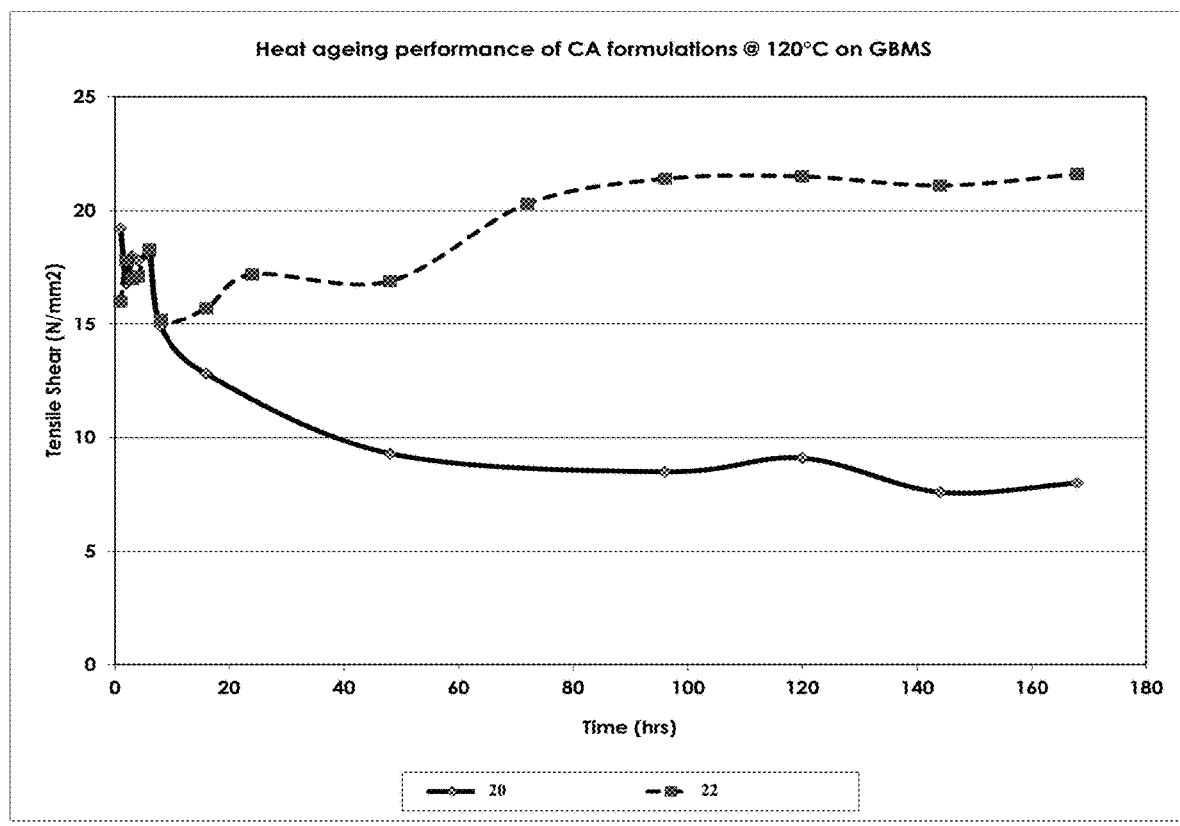
FIG. 7 shows the tensile strength performance for formulation 20 and formulation 22 of Table 3 on GBMS after heat ageing at 120° C. over a 160 hour period.

FIG. 7 shows the heat ageing performance of formulations 20 and 22 on GBMS at 120° C. The tensile strength performance of formulation 22 which comprises 1% by weight (of the total composition) of each of the additives naphthosultone and ethylene sulphite performed significantly better than control formulation 20, absent said additives.

Excellent strength retention was observed after heat ageing at 150° C. The addition of the additives naphthosultone and ethylene sulphite eliminate the dip associated with heat ageing of allyl cyanoacrylate compositions. In general an increase in tensile strength was observed after 12 weeks.

The bond strength associated with formulation 26 is seen to increase over time at 180° C.

The harsh conditions of aging at 200° C. are reflected in a large drop in performance, albeit formulation 26, which comprises only allyl cyanoacrylate as the cyanoacrylate demonstrates good tensile strength up to the 6 week mark.

All formulations demonstrated good tensile strength retention in the highly humid conditions.

Table 4 provides compositions comprising varying levels of allyl cyanoacrylate and additive components.

TABLE 4

| Formulation | 29 | 30 | 31 | 32 |
|---|---|---|---|---|
| Ethyl CA | 35.95 | — | 40.05 | 39.55 |
| Allyl CA | 38.95 | 74.90 | 40.25 | 39.75 |
| Stabiliser | 3.0 | 3.0 | 0.2 | 0.2 |
| Vamac VSC5500 | 10.0 | 10.0 | — | 8.0 |
| PMMA | — | — | 7.0 | — |
| HDDA | 10.0 | 10.0 | — | — |
| TetrahydroPA | 0.1 | 0.1 | — | — |
| Naphthosultone | 1.0 | 1.0 | — | — |
| Ethylene Sulphite | 1.0 | 1.0 | — | — |
| 1,6-Bis CA | — | — | 12.5 | 12.5 |

Figure 8:
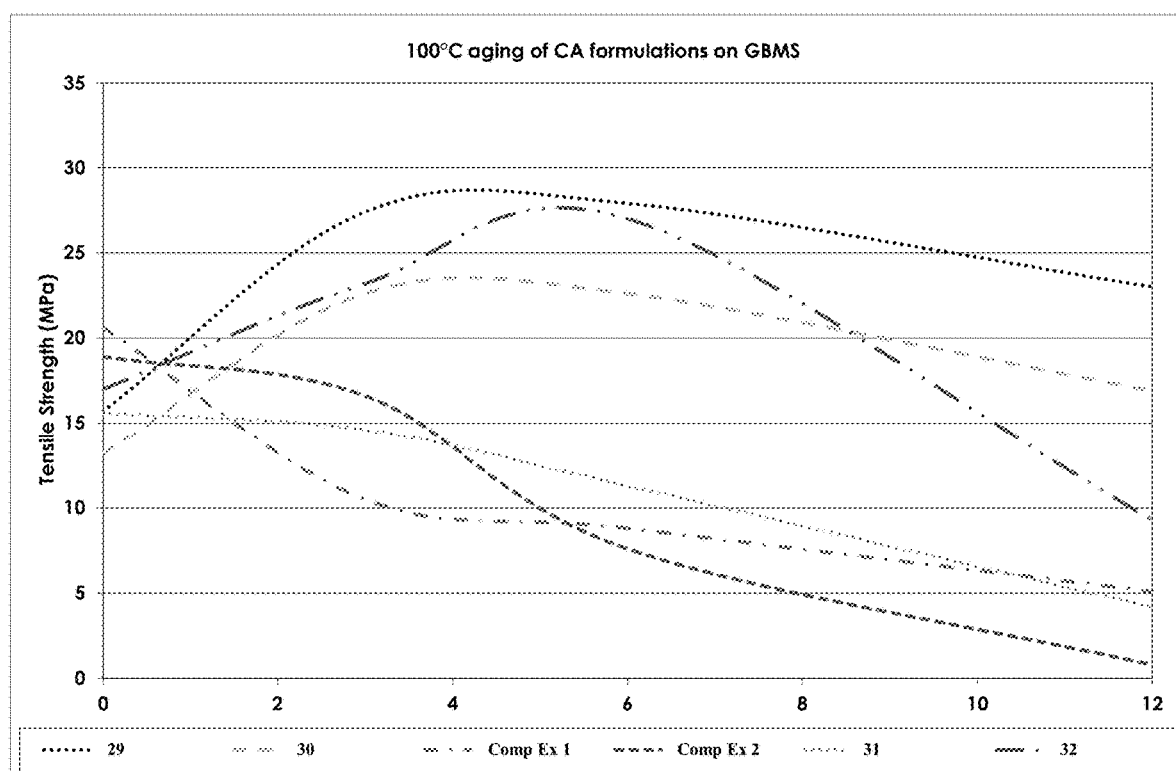
FIG. 8 shows the tensile strength performance for formulations of Table 4 on GBMS after heat ageing at 100° C. over a 12 week period.

The thermal performance of the compositions of table 4 and comparative examples 1 and 2 was assessed (see FIG. 8). Comparative examples 1 and 2 are general purpose instant adhesive formulations based on ethyl CA. Comparative example 1 comprises ethyl CA and PMMA, whereas comparative example 2 comprises ethyl CA and Vamac.

FIG. 8 shows the tensile strength performance of the formulations of Table 4 and comparative examples 1 and 2 on GBMS substrate after heat ageing at 100° C. over a 12 week period.

Formulation 29 demonstrated excellent tensile strength performance with bond strengths exceeding 23 MPa after heat ageing at the prescribed temperature for 2000 hours.

Figure 9:
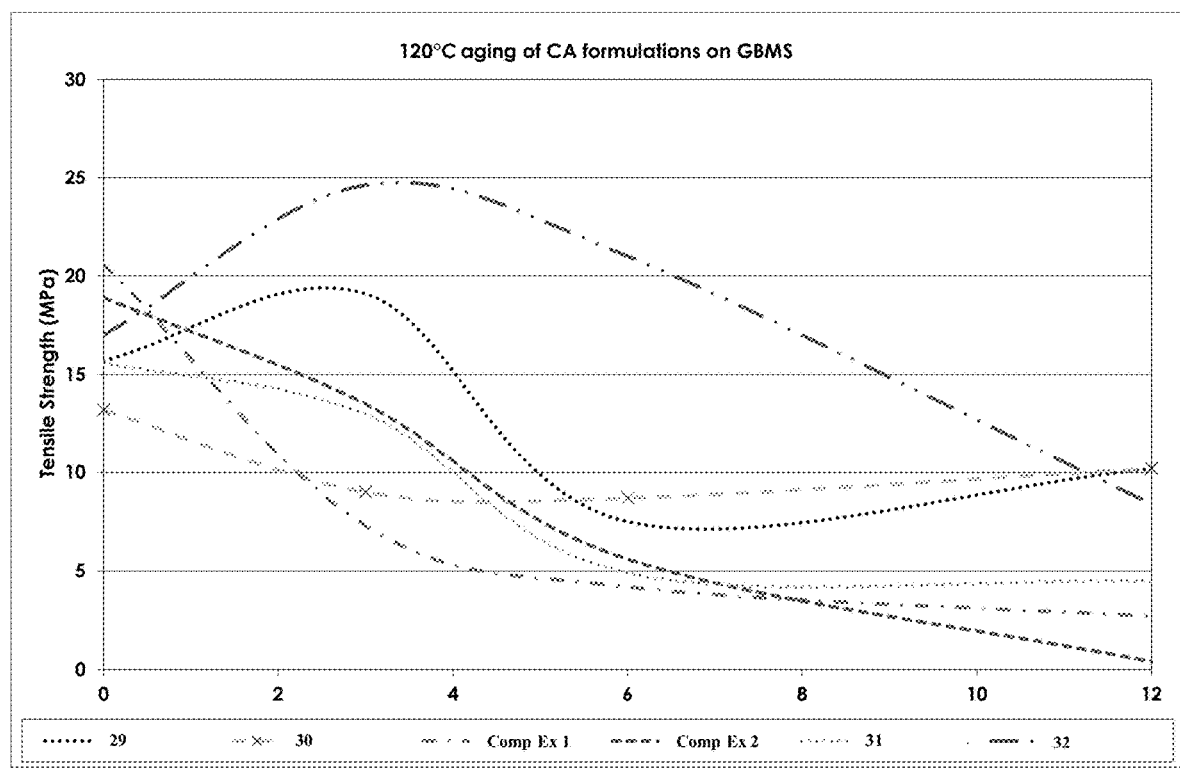
FIG. 9 shows the tensile strength performance for formulations of Table 4 on GBMS after heat ageing at 120° C. over a 12 week period.
Figure 10:
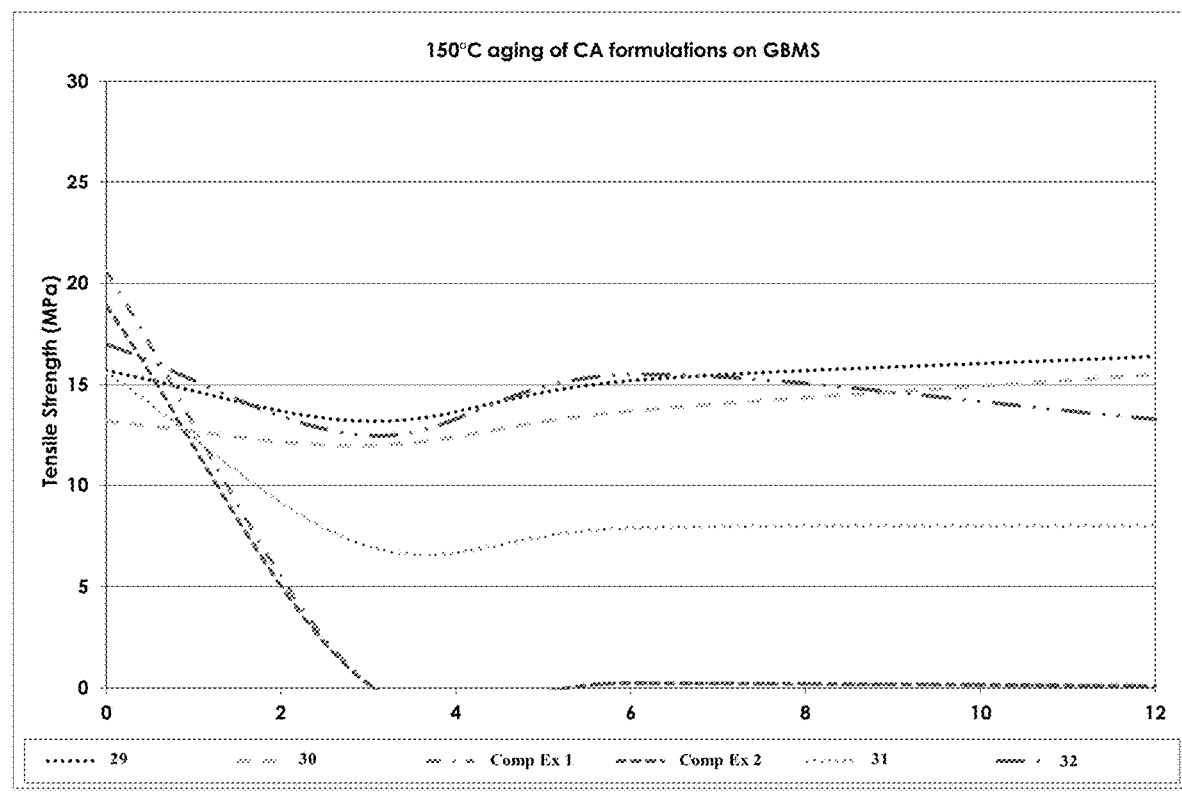
FIG. 10 shows the tensile strength performance for formulations of Table 4 on GBMS after heat ageing at 150° C. over a 12 week period.
Figure 11:
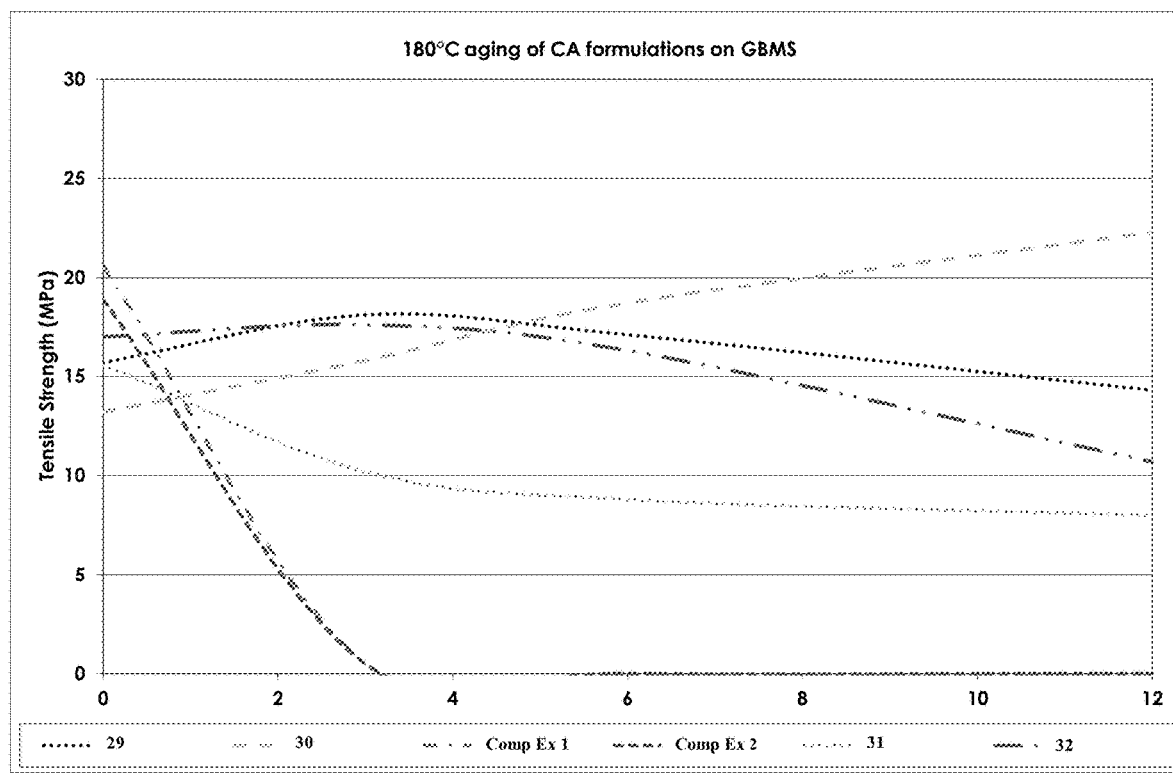
FIG. 11 shows the tensile strength performance for formulations of Table 4 on GBMS after heat ageing at 180° C. over a 12 week period.

At 120° C. formulation 32 shows excellent retention of bond strength out to 1000 hours and then falls to around 8 MPa after 2000 hours. Formulation 29 again shows excellent strength retention after 500 hours but falls to 7 MPa after 1000 hours before rebuilding its strength back to 10 MPa after 2000 hours (see FIG. 9).

Figure 12:
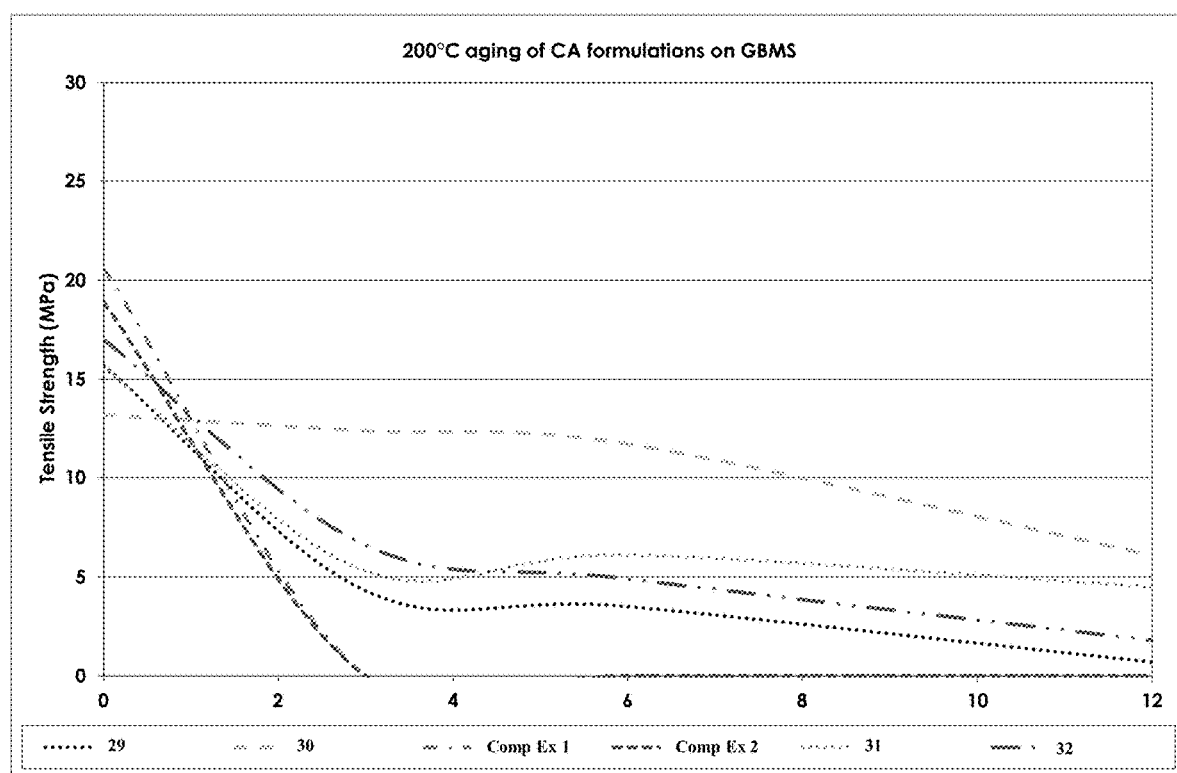
FIG. 12 shows the tensile strength performance for formulations of Table 4 on GBMS after heat ageing at 200° C. over a 12 week period.
Figure 13:
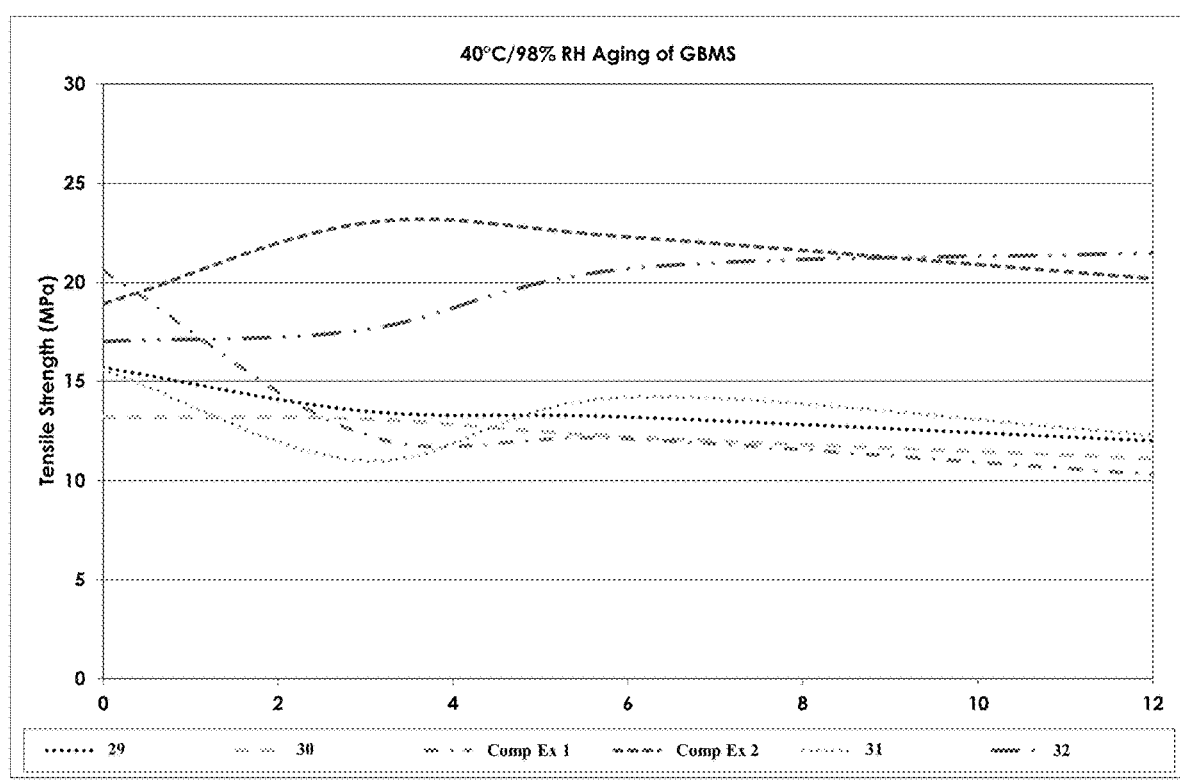
FIG. 13 shows the tensile strength performance for formulations of Table 4 on GBMS after heat ageing at 40° C. in 98% relative humidity over a 12 week period.

At 150° C. and 180° C. formulation 29 and formulation 33 behave in a very similar manner with approximately 100% retention of strength being observed for formulation 29 at both temperatures (See FIGS. 12 and 13).

At 200° C. only formulation 30 which comprises solely allyl cyanoacrylate as the cyanoacrylate component shows any appreciable strength retention. (See FIG. 12)

The performance of formulations 29-32, and that of comparative examples 1 and 2 after heat ageing at 40° C. in 98% relative humidity, is shown in FIG. 13.

Overall, the addition of a component functionalized with at least two blocked hydroxyl groups, such as hexane diol diacrylate, to a cyanoacrylate formulation comprising allyl cyanoacrylate and a rubber toughening agent provides a composition having excellent thermal ageing properties. The combination excels at 100° C. and shows 100% tensile strength retention after 2000 hours at 150° C. and 180° C. At 120° C. good tensile strength performance is demonstrated up to the 500 hour mark, with a dip in performance being witnessed thereafter, before the tensile strength recovers to about 10 MPa.

The effect of thermal resistance conferring additives on the compositions of the invention was also investigated. Table 5 provides compositions with varying levels of components and additives.

TABLE 5

|  | 33 | 34 | 35 | 36 | 37 |
|---|---|---|---|---|---|
| Ethyl VS | 80.0 | 79.0 | 59.0 | 39.0 | — |
| Allyl CA | — | — | 20.0 | 40.0 | 81.1 |
| BF₃ (30 ppm) | 1.9 | 1.9 | 1.9 | 1.9 | 1.9 |
| Vamac VSC 5500 | 10.0 | 10.0 | 10.0 | 10.0 | 10.0 |
| HDDA MW 226 | 8.0 | 8.0 | 8.0 | 8.0 | 8.0 |
| Tetrahydro Phthalic Anhydride | 0.1 | 0.1 | 0.1 | 0.1 | 0.1 |
| Tetrafluoroisophthalonitrile | — | 1.0 | 1.0 | 1.0 | 1.0 |
| Initials |  |  |  |  |  |
| GBMS 1 Week RT Cure | 21.6 | 20.2 | 18.0 | 17.5 | 15.8 |
| 100° C. |  |  |  |  |  |
| 3 Weeks | 23.1 | 25.2 | 28.5 | 28.4 | 23.2 |
| 6 Weeks | 24.2 | 27.8 | 29.6 | 28.5 | 23.8 |
| 120° C. |  |  |  |  |  |
| 3 Weeks | 7.6 | 24.7 | 23.8 | 17.2 | 23.4 |
| 6 Weeks | 4.4 | 20.7 | 15.5 | 13.8 | 11.2 |
| 150° C. |  |  |  |  |  |
| 3 Weeks | — | 3.6 | 6.7 | 12.1 | 8.7 |
| 6 Weeks | — | 5.4 | 7.9 | 12.1 | 9.4 |
| 180° C. |  |  |  |  |  |
| 3 Weeks | — | 3.5 | 4.8 | 12.8 | 11.2 |
| 6 Weeks | — | 3.1 | 4.1 | 8.9 | 13.3 |

Formulations 35 and 36 comprise varying levels of ethyl CA and allyl CA. Both formulations comprise 1.0 wt % tetrafluoroisophthalonitrile. The initial tensile strength and thermal performance of said compositions proved excellent.

The thermal performance of formulations of table 6, was also assessed. Therein, the benefit of thermal resistance conferring additives in allyl cyanoacrylate formulations was examined.

As seen above, and as further outlined in Table 6, formulations of the invention further comprising phthalic anhydride and tetrafluoroisophthalonitrile demonstrated excellent thermal performance when aged for 6 weeks at elevated temperatures of from 100° C. to 220° C. The effect of varying the level of tetrafluoroisophthalonitrile and hexane diol diacrylate is shown in Table 6. The benefit of including a maleimide component, was also examined, and as seen in formulations 41 and 42, this led to further enhancement of initial tensile strength performance and thermal aged performance.

TABLE 6

| Formulation | 38 | 39 | 40 | 41 | 42 |
|---|---|---|---|---|---|
| Allyl CA | 81.1 | 82.6 | 80.6 | 82.1 | 81.1 |
| BF₃ (30 ppm) | 1.9 | 1.9 | 1.9 | 1.9 | 1.9 |
| Vamac Rubber | 10.0 | 10.0 | 10.0 | 10.0 | 10.0 |

TABLE 6-continued

| Formulation | 38 | 39 | 40 | 41 | 42 |
|---|---|---|---|---|---|
| Hexanediol Diacrylate | 4.0 | 4.0 | 6.0 | 4.0 | 4.0 |
| Phthalic Anhydride | 0.5 | 0.5 | 0.5 | 0.5 | 0.5 |
| Tetrafluoroisophthalonitrile | 0.5 | 1.0 | 1.0 | 0.5 | 0.5 |
| BMI-70 | — | — | — | 1.0 | 2.0 |
| Initials GBMS (MPa) | | | | | |
| Cure 1 Week @ RT | 15.8 | 15.9 | 14.3 | 21.2 | 21.9 |
| 100° C. | | | | | |
| 6 Weeks | 22.0 | 21.7 | 21.7 | 31.0 | 30.9 |
| 120° C. | | | | | |
| 3 Weeks | 18.9 | 17.2 | 18.2 | 29.8 | 28.9 |
| 6 Weeks | 7.9 | 10.7 | 11.5 | 15.7 | 14.2 |
| 150° C. | | | | | |
| 6 Weeks | 7.2 | 9.6 | 7.2 | 9.9 | 10.2 |
| 180° C. | | | | | |
| 6 Weeks | 11.4 | 13.9 | 11.8 | 15.6 | 15.4 |
| 200° C. | | | | | |
| 6 Weeks | 16.4 | 14.5 | 14.0 | 14.8 | 14.3 |
| 220° C. | | | | | |
| 6 Weeks | 11.7 | 11.2 | 10.7 | 12.0 | 14.0 |

Formulations 41 and 42 which comprise phthalic anhydride, tetrafluoroisophthalonitrile and a bismaleimide additive, specifically, bis-(3-ethyl-5-methyl-4-maleimidephenyl)methane, (available from K-I Chemical Industry Co. Ltd under the tradename BMI-70) demonstrated excellent thermal resistance from 100° C. to 220° C. The heat ageing performance of allyl cyanoacrylate formulations were particularly improved in the 100° C. to 150° C. range. For example, formulation 41 had a 74% retention of tensile strength after heat ageing at 120° C. for 1000 hours (6 weeks).

TABLE 7

| | 43 | 44 |
|---|---|---|
| Ethyl CA | 42.1 | — |
| Allyl CA | 40.0 | 82.1 |
| 8F3 (30 ppm) | 1.9 | 1.9 |
| Vamac Rubber | 10.0 | 10.0 |
| Hexanediol diacrylate | 4.0 | 4.0 |
| Phthalic Anhydride | 0.5 | 0.5 |
| Tetrafluoroisophthalonitrile | 0.5 | 0.5 |
| BMI-70 | 1.0 | 1.0 |
| Initial Tensile (4Pa) | | |
| GBMS 1 Week Cure | 19.8 | 20.2 |
| Heat Aging: 1000 hours (MPa) | | |
| 100° C. | 31.0 | 28.2 |
| 120° C. | 25.4 | 17.2 |
| 150° C. | 12.3 | 10.7 |
| 180° C. | 12.5 | 15.4 |
| 200° C. | 11.6 | 14.3 |
| 220° C. | 0.0 | 9.3 |
| Humid Aging: 1000 hours (MPa) | | |
| 40° C./98% RH | 25.7 | 22.0 |
| 65° C./95% RH | 21.7 | 17.8 |

Table 7 compares the performance of formulation 44 which comprises allyl cyanoacrylate as the sole cyanoacrylate component, with formulation 43 which comprises both allyl cyanoacrylate and ethyl cyanoacrylate. The tensile strength performance of both formulations which have been a range of temperatures for 1000 hours is tested, as is their performance under humid conditions. While heat ageing formulation 43 at 100° C. and 120° C., led to an increase in tensile strength performance, formulation 44 retained about 85% of its tensile strength when aged at 120° C. for 1000 hours, and furthermore, retained about 45% of its initial tensile strength after heat ageing at 220° C. for 1000 hours.

As can be seen in Table 7, the combination of hexanediol diacrylate, phthalic anhydride, tetrafluoroisophthalonitrile and bis-(3-ethyl-5-methyl-4-maleimidephenyl)methane significantly enhances the thermal performance, and humid ageing performance of allyl cyanoacrylate formulations.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A cyanoacrylate composition, comprising:
   (a) allyl-2-cyanoacrylate,
   (b) a rubber toughening agent comprised of (i) reaction products of the combination of ethylene, methyl acrylate and monomers having carboxylic acid cure sites, (ii) dipolymers of ethylene and methyl acrylate, and combinations of (i) and (ii), and
   (c) a component represented by:

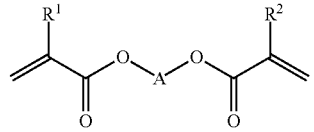

wherein A is a $C_4$ to $C_{30}$ aliphatic chain which can optionally comprise heteroatoms selected from the group consisting of O, N and S, and wherein said chain is optionally substituted with one or more acrylate and/or methacrylate functional groups, and/or one or more $C_1$-$C_{10}$ alkyl groups; and wherein $R^1$ and $R^2$ are the same or different and are each optionally selected from the group consisting of H and $C_1$ to $C_6$ alkyl.

2. The composition according to claim 1, further comprising a filler.

3. The composition according to claim 2, wherein the filler is selected from the group consisting of carbon black, silica and combinations thereof.

4. The composition according to claim 1, further comprising an acidic stabilizer and a free radical inhibitor.

5. The composition of claim 1, wherein the rubber toughening agent is present in an amount from 1.5% to 20% by weight.

6. The composition according to claim 1, further comprising the cyanoacrylate component having the structure $H_2C{=}C(CN){-}COOR$, wherein R is selected from the group consisting of $C_{1-15}$ alkyl, alkoxyalkyl, cycloalkyl, alkenyl, aralkyl, aryl, and haloalkyl groups.

7. The composition according to claim 6, wherein the cyanoacrylate component comprises ethyl-2-cyanoacrylate.

8. The composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

9. The composition according to claim 8, wherein the calixarene is tetrabutyl tetra[2-ethoxy-2-oxoethoxy]calix-4-arene.

10. The composition according to claim 8, wherein the crown ether is selected from the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

11. The composition according to claim 8, wherein the poly(ethyleneglycol) di(meth)acrylate is within the following structure:

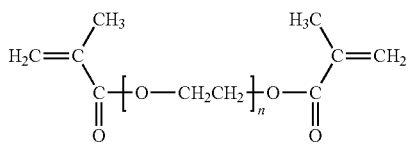

wherein n is greater than 3.

12. The composition according to claim 1, further comprising additives selected from the group consisting of shock resistant additives, thixotropy conferring agents, thickeners, dyes, thermal degradation resistance enhancers, and combinations thereof.

13. The composition according to claim 12, wherein the shock resistant additive is citric acid.

14. The composition according to claim 1, wherein the component (c) is hexane diol diacrylate.

15. The composition according to claim 1, further comprising at least one additive selected from the group consisting of: 2-sulfobenzoic acid anhydride, triethylene glycol di(para-toluene sulfonate), trifluoroethyl para-toluene sulfonate, dimethyl dioxolen-4-ylmethyl para-toluene sulfonate, para-toluene sulfonic anhydride, methane sulfonic anhydride, 1,3 propylene sulfite, dioxathiolene dioxide, 1,8-naphthosultone, sultone 1,3-propane, sultone 1,4-butene, allyl phenyl sulfone, 4-fluorophenyl sulfone, dibenzothiophene sulfone, bis(4-fluorophenyl) sulfone, ethyl p-toluenesulfonate, trifluoromethanesulfonic anhydride, ethylene sulphite and tetrafluoroisophthalonitrile and combinations thereof.

16. The composition according to claim 15, wherein the additive is selected from the group consisting of 1,8-naphthosultone and ethylene sulphite and tetrafluoroisophthalonitrile.

17. The composition according to claim 15 wherein the thermal resistance conferring agent is a mixture of 1,8-naphthosultone and ethylene sulphite.

18. The composition according to claim 1 further comprising a maleimide component.

19. The composition according to claim 18, wherein the maleimide component has one of the following structures:

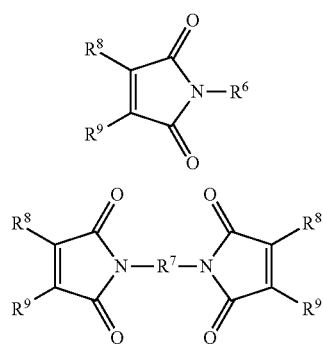

$R^6$ and $R^7$ are independently selected from $C_1$-$C_{50}$ alkyl, and $C_4$-$C_{20}$ aryl, wherein $R^6$ and $R^7$ are each independently optionally substituted with one or more of nitro, hydroxyl, halogen, $C_1$-$C_{20}$ alkyl, $C_3$-$C_{20}$ cycloalkyl, $C_7$-$C_{20}$ aralkyl and $C_7$-$C_{20}$ alkaryl; and $R^8$ and $R^9$ are independently selected from H, $C_1$-$C_{50}$ alkyl, and $C_1$-$C_{50}$ aryl, or together $R^8$ and $R^9$ may form a ring comprising from 5 to 20 carbon atoms.

20. The composition according to claim 19, wherein the maleimide component is selected from the group consisting of:

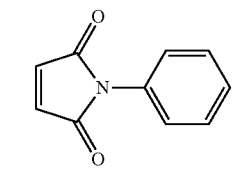

X

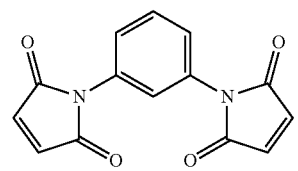

XI

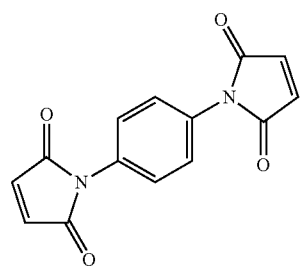

XII

-continued

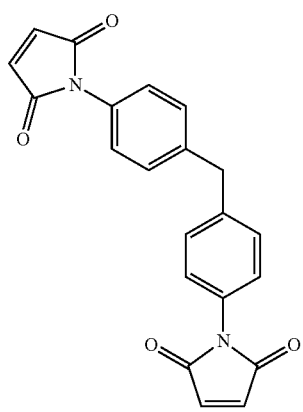
XIII

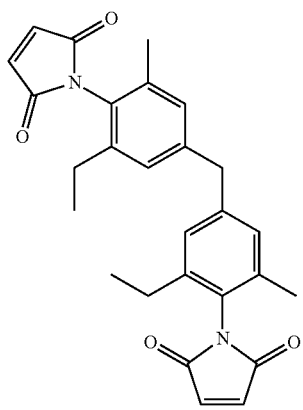
XIV

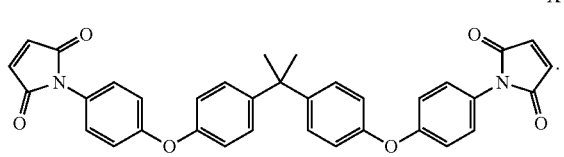
XV

21. A method of bonding together two substrates, comprising the steps of:

applying the cyanoacrylate composition according to claim 1, to at least one of the substrates and mating together the substrates to permit an adhesive bond to form from the cyanoacrylate composition between the mated substrates.

22. A method of preparing the cyanoacrylate composition according to claim 1, comprising the steps of:

providing allyl-2-cyanoacrylate component, a rubber toughening agent comprised of (a) reaction products of the combination of ethylene, methyl acrylate and monomers having carboxylic acid cure sites, (b) dipolymers of ethylene and methyl acrylate, and combinations of (a) and (b), and a component represented by:

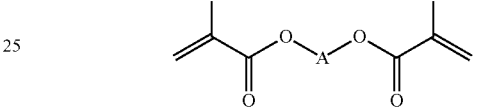

wherein A is a $C_4$ to $C_{30}$ aliphatic chain which can optionally comprise heteroatoms selected from the group consisting of O, N and S, and wherein said chain is optionally substituted with one or more acrylate and/or methacrylate functional groups, and/or one or more $C_1$-$C_{10}$ alkyl groups; and wherein $R^1$ and $R^2$ are the same or different and are each optionally selected from the group consisting of H and $C_1$ to $C_6$ alkyl, and mixing to form the cyanoacrylate composition.

* * * * *

UNITED STATES PATENT AND TRADEMARK OFFICE
CERTIFICATE OF CORRECTION

PATENT NO. : 10,947,418 B2
APPLICATION NO. : 15/972944
DATED : March 16, 2021
INVENTOR(S) : Raymond Tully et al.

It is certified that error appears in the above-identified patent and that said Letters Patent is hereby corrected as shown below:

In the Specification

Column 20, Line 20, Table 5 change "Ethyl VS" to --Ethyl CA--.

Column 21, Line 43, Table 7 change "8F3 (30 ppm)" to --$BF_3$ (30 ppm)--.

Column 21, Line 49, Table 7 change "Initial Tensile (4Pa)" to --Initial Tensile (MPa)--.

Signed and Sealed this
Sixteenth Day of April, 2024

*Katherine Kelly Vidal*

Katherine Kelly Vidal
*Director of the United States Patent and Trademark Office*